(No Model.)

T. PATES.
PLANTING PLOW.

No. 338,186. Patented Mar. 16, 1886.

Witnesses
Sam'l B. Dover.
Arthur Holladay.

Inventor.
Thomas Pates.
By John Lane
Atty.

United States Patent Office.

THOMAS PATES, OF ALTON, ILLINOIS, ASSIGNOR TO THE HAPGOOD PLOW COMPANY, OF SAME PLACE.

PLANTING-PLOW.

SPECIFICATION forming part of Letters Patent No. 338,186, dated March 16, 1886.

Application filed December 14, 1885. Serial No. 185,575. (No model.)

*To all whom it may concern:*

Be it known that I, THOMAS PATES, a citizen of the United States, residing at Alton, in the county of Madison and State of Illinois, have invented a new and useful Improvement in Planting-Plows, of which the following is a specification.

This invention relates to that class of planting-plows having a plow in advance to open a wide furrow, a drill-tooth following to open a slit along the center of the furrow, and covering-blades to fill the slit, covering the seed.

The object of my invention is to provide a better covering of the seed in all conditions of soil by an improved construction and attachment of the covering-blades, whereby the blades may be better adapted to be adjusted to meet the various kinds and conditions of the soil, and also less liable to gather trash and clog than heretofore.

Heretofore it has been usual to attach the covering-blades to the rear part of the plow—as to the seed-spout, beam, or mold-board—in such a position that the trash passing over the top of the mold-board would fall and lodge upon the blades, so as to clog the working of the blades; also, such blades so connected were of great length and adjustable only in their attachment to the plow, and were difficult to adjust to the various kinds of working and conditions of the soil. My improvement contemplates to avoid or overcome these heretofore objections and troubles.

My invention consists in certain improved construction, arrangement, and adaptation of parts, which will first be set forth in the specification, and afterward pointed out in the claims.

Figure 1:
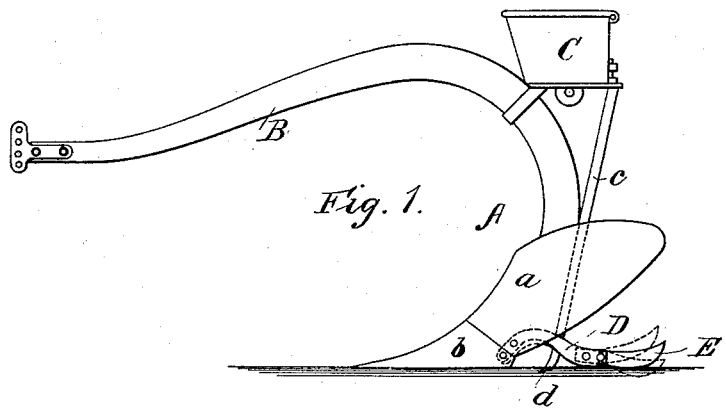
Figure 2:
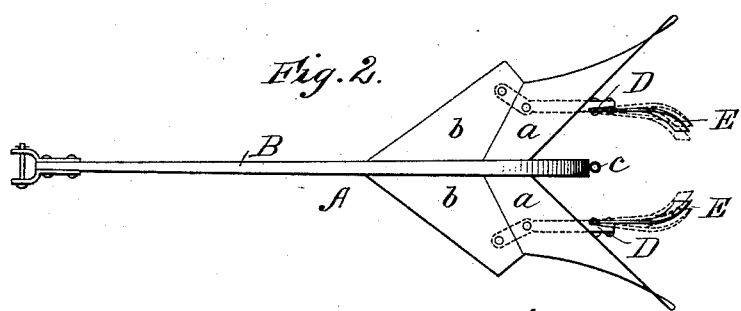
Figure 3:
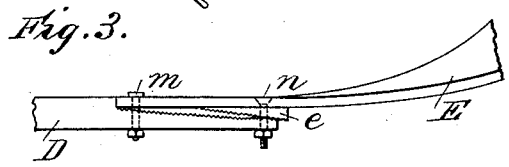
Figure 6:
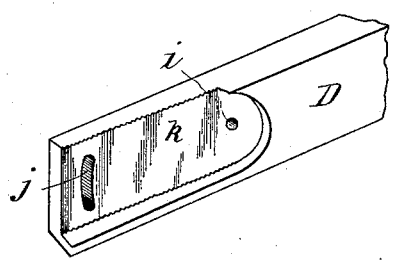
Figure 4:
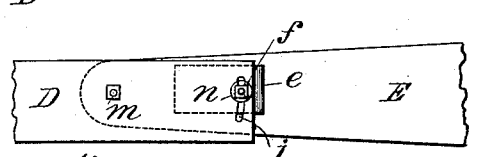
Figure 5:
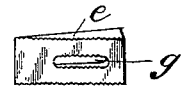

Referring to the drawings, like letters refer to like parts in all the figures, in which Figure 1 is a side elevation of a planting-plow, showing my improvements, showing the covering-blade E adjustably attached to the rear end of the runner D. Fig. 2 is a top or plan view of same, with the seed-box C and the top part of the seed-spout c removed, showing the adjustable blades in position for covering. Fig. 3 is a top or plan view of parts enlarged, showing the rear end part of the runner D and the front end part of the covering-blade E, and showing how they are connected together and how the blade may be adjusted laterally by means of the wedge-washer e. Fig. 4 is a side elevation view of same parts shown in Fig. 3, showing how the blade may be moved up and down and adjusted to any depth of working desired. Fig. 5 is a perspective view of the wedge-washer e enlarged, showing how it may be constructed with the long-slotted perforation g. Fig. 6 is a perspective view of the rear end part of the runner D enlarged, showing how it may be constructed with the recess k; also showing the perforations i and and j, and how the latter is long-slotted.

In the drawings, A represents an ordinary listing planting-plow provided with the mold-board a, share b, beam B, and carrying the seed-box C, seed-spout c, with the drill-tooth d, and with the runners D D, all of which may be of ordinary construction, except as modified to use my improvements.

D represents the runners attached to the rear of the plow and adapted to slide along the bottom of the furrow, to steady the working of the plow, as ordinary. In my improvements I adapt and provide the rear end part of said runner with perforations i and j, for connecting and supporting the covering-blade E. The said perforation j is preferably made long-slotted for adjusting the blade up and down, as shown, and the recess k, for seating the blade, may or may not be used, as desired, and said recess may be dispensed with without departing from the purview of my invention.

e represents a wedge-washer, constructed with a thin side and a thick side, as shown, and the perforation g, preferably long-slotted, as shown, for use in adjusting the blade laterally.

E represents the covering-blades, constructed of thin steel and curved inwardly to move the soil and cover the seed. The front end part of said blade is provided with perforations and attached to the runner D by means of the bolts m and n.

In operation it will be observed that the blade is connected pivotally on the bolt m, that the rear end of the blade may be moved up and down, moving the bolt n in the slot j, that the blade may be set in any desired position, and made rigid by tightening the nut on the said bolt n, and when desired to move the blades and adjust them to a new position laterally the nutted bolt n is first loosened, then the wedge-washer e is moved to any position desired, or may be removed and the said bolt again tightened, making the blade rigid in its new position. The said blades attached to the rear end of the runners which slide upon the bottom of the furrow are more readily adjusted, better adjusted, and more out of the way of trash falling over the mold-board than heretofore, and should any trash fall upon the runners or blades it would at once be swept away by the bottom of the furrow.

I claim—

1. In a planting-plow provided with a plow in advance adapted to open a wide furrow and runners adapted to steady the plow, the covering-blades constructed separate and attached to the said runners with bolts, substantially as and for the purpose set forth.

2. In a planting-plow, the combination of the plow A with the runners D, and with the covering-blades E, the latter adjustably attached to the said runners, substantially as and for the purpose set forth.

3. In a planting-plow, the combination of the plow A, provided with the mold-boards $a$, shares $b$, beam B, and carrying the seed-box C, seed-spout $c$, with the drill-tooth $d$, and runners D, with the covering-blades E, adjustably attached to the said runners, substantially as and for the purpose set forth.

THOMAS PATES.

Witnesses:
CHAS. S. PHILIPS,
WM. R. PINCKARD.